(12) United States Patent
Ikuta et al.

(10) Patent No.: US 7,514,382 B2
(45) Date of Patent: Apr. 7, 2009

(54) SYNTHETIC QUARTZ GLASS FOR OPTICAL MEMBER AND ITS PRODUCTION METHOD

(75) Inventors: Yoshiaki Ikuta, Yokohama (JP); Noriyuki Agata, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 239 days.

(21) Appl. No.: 11/398,669

(22) Filed: Apr. 6, 2006

(65) Prior Publication Data

US 2006/0183623 A1 Aug. 17, 2006

Related U.S. Application Data

(63) Continuation of application No. PCT/JP04/19443, filed on Dec. 17, 2004.

(30) Foreign Application Priority Data

Dec. 17, 2003 (JP) ............................. 2003-418814

(51) Int. Cl.
*C03C 3/06* (2006.01)
*C03B 20/00* (2006.01)

(52) U.S. Cl. .......................... 501/54; 501/53
(58) Field of Classification Search .................. 501/53, 501/54
See application file for complete search history.

(56) References Cited

U.S. PATENT DOCUMENTS

| | | |
|---|---|---|
| 6,475,575 B1 | 11/2002 | Ikuta et al. |
| 6,499,317 B1 | 12/2002 | Ikuta et al. |
| 6,544,914 B1 | 4/2003 | Kikugawa et al. |
| 6,550,277 B1 | 4/2003 | Uebbing et al. |
| 6,576,578 B1 | 6/2003 | Ikuta et al. |
| 6,611,317 B1 | 8/2003 | Ogawa et al. |
| 7,022,633 B2 | 4/2006 | Ikuta et al. |
| 2003/0051507 A1 | 3/2003 | Ikuta et al. |
| 2003/0115904 A1 | 6/2003 | Kuhn et al. |
| 2005/0068644 A1 | 3/2005 | Ikuta et al. |
| 2005/0176572 A1 | 8/2005 | Hosono et al. |

FOREIGN PATENT DOCUMENTS

| | | |
|---|---|---|
| EP | 1 084 995 | 3/2001 |
| EP | 1 103 528 | 5/2001 |
| EP | 1 112 973 | 7/2001 |
| EP | 1 130 000 | 9/2001 |
| EP | 1 493 719 A1 | 1/2005 |
| JP | 03-088742 | 4/1991 |
| JP | 08/81225 | 3/1996 |
| JP | 09-235134 | 9/1997 |
| JP | 09-241030 | 9/1997 |
| JP | 11-116248 | 4/1999 |
| JP | 2000-191329 | 7/2000 |
| JP | 2002-12441 | 1/2002 |
| WO | 03/080526 | 10/2003 |

OTHER PUBLICATIONS

U.S. Appl. No. 11/398,669, filed Apr. 6, 2006, Ikuta et al.
U.S. Appl. No. 10/969,954, filed Oct. 22, 2004, US2005/0068644 A1, Ikuta, et al.
U.S. Appl. No. 10/283,055, filed Oct. 30, 2002, US2003/0051507 A1, Ikuta, et al.
U.S. Appl. No. 09/623,152, filed Oct. 16, 2000, Ikuta, et al.
U.S. Appl. No. 09/600,153, Sep. 13, 2000, Ikuta, et al.
U.S. Appl. No. 10/509,029, filed Apr. 26, 2005, US2005/0176572 A1, Hosono et al.
U.S. Appl. No. 12/182,361, filed Jul. 30, 2008, Agata et al.
U.S. Appl. No. 11/398,669, filed Apr. 6, 2006, US2006/0183623 A1, Ikuta et al.

*Primary Examiner*—Anthony J Green
(74) *Attorney, Agent, or Firm*—Oblon, Spivak, McClelland, Maier & Neustadt, P.C.

(57) ABSTRACT

A synthetic quartz glass for an optical member which is free from compaction and rarefaction is obtained. A synthetic quartz glass for an optical member to be used for an optical device employing a light having a wavelength of at most 400 nm and at least 170 nm as a light source, which contains substantially no oxygen excess defects, dissolved oxygen molecules nor reduction type defects, which has a chlorine concentration of at most 50 ppm and a OH group concentration of at most 100 ppm, and which contains oxygen deficient defects within a concentration range of at most $5 \times 10^{14}$ defects/cm$^3$ and at least $1 \times 10^{13}$ defects/cm$^3$. The fluorine concentration is preferably at most 100 ppm.

5 Claims, 1 Drawing Sheet

Fig. 1

SYNTHETIC QUARTZ GLASS FOR OPTICAL MEMBER AND ITS PRODUCTION METHOD

TECHNICAL FIELD

The present invention relates to a synthetic quartz glass for an optical member of an optical device employing a light having a wavelength of from 170 to 400 nm as a light source and its production process. More specifically, it relates to a synthetic quartz glass for an optical member to be used as a material for an optical component such as a lens, a prism, an etalon, a diffraction grating, a photomask, a pellicle (pellicle material and pellicle frame) and a material for windows, to be used in an optical device employing a KrF excimer laser (wavelength: 248 nm), an ArF excimer laser (wavelength: 193 nm), a deuterium lamp (wavelength: 170 to 400 nm), a $Xe_2$ excimer lamp (wavelength: 172 nm), a mercury lamp or the like as a light source.

BACKGROUND ART

In production of a semiconductor integrated circuit, an exposure apparatus has been widely utilized which transfers a fine circuit pattern drawn on a mask original plate on a wafer. Along with high integration and high functionality of an integrated circuit, an integrated circuit becomes finner. And an exposure apparatus is required to form an image of a circuit pattern with high resolution on a wafer with a long focal depth, and shortening of the wavelength of the exposure light source is being advanced. The exposure light source has been shifted from conventional g-line (wavelength: 436 nm) to i-line (wavelength: 365 nm), to a KrF excimer laser (wavelength: 248 nm) to an ArF excimer laser (wavelength: 193 nm).

A synthetic quartz glass has been mainly employed as an optical member for an exposure apparatus employing a light having a wavelength of from 170 to 400 nm as a light source, since it is excellent in transparency to light over a wide range from a near infrared region to an ultraviolet region, it has an extremely small thermal expansion coefficient and it is relatively easily processed. As a synthetic quartz glass conventionally employed as an optical member of an exposure apparatus, for example, one as disclosed in JP-A-3-88742 has been known. That is, a synthetic quartz glass having a OH group content of at least 10 ppm and containing hydrogen in an amount of at least $5 \times 10^{16}$ molecules/$cm^3$ has been known. When a synthetic quartz glass is irradiated with ultraviolet lights, paramagnetic defects such as E'center ($\equiv$Si·) and NBOHC ($\equiv$SiO·) are formed. Such paramagnetic defects have optical absorption bands centered at a wavelength of 220 nm and at a wavelength of 260 nm, respectively, and cause a decrease in the light transmittance over a wide wavelength range of from 180 to 300 nm.

Hydrogen molecules in the synthetic quartz glass play a role in converting the E'center and the NBOHC induced by irradiation with ultraviolet lights into $\equiv$SiH and $\equiv$SiOH, respectively, having no absorption band centered at a wavelength range of from 190 to 300 nm. $\equiv$SiH and $\equiv$SiOH do not have an optical absorption band centered at a wavelength range of from 170 to 300 nm, and thus the decrease in the transmittance due to irradiation with ultraviolet lights is suppressed. In the above JP-A-3-88742, attention is paid to the defect restoration effect of hydrogen molecules, and it relates to a method of suppressing the decrease in the transmittance of the synthetic quartz glass upon ultraviolet lights irradiation.

However, when the synthetic quartz glass is irradiated with ultraviolet lights, not only the decrease in the light transmittance but also phenomena called compaction and rarefaction occur. The compaction is such a phenomenon that by irradiation with ultraviolet lights, the density of the synthetic quartz glass at the irradiated portion increases, and along with this change in the density, the refractive index of the synthetic quartz glass at the irradiated portion increases. On the other hand, the rarefaction is such a phenomenon that by irradiation with ultraviolet lights, the density of the synthetic quartz glass at the irradiated portion decreases, and along with this change in the density, the refractive index of the synthetic quartz glass at the irradiated portion decreases. Whether either phenomenon of compaction and rarefaction occurs depends on the type of the synthetic quartz glass or irradiation conditions (energy density, accumulated irradiation energy amount) (C. K. van Peski, et. al., "Behavior of fused silica irradiated by low level 193 rm excimer laser for tens of billions of pulses", J. Non-cryst. Solids, 265, pp. 285-289 (2000)).

Particularly with respect to the energy density, compaction occurs in a case of irradiation at a pulse energy density of at least 0.05 to 0.1 $mJ/cm^2$/pulse, and rarefaction occurs in a case of irradiation at a lower energy density in general. In a semiconductor exposure apparatus, a fine pattern on a photomask is microtransferred on a water, and accordingly a projection lens is required to have an extremely high uniformity of the refractive index. An overall or local change in the refractive index of the projection lens by irradiation with ultraviolet lights exerts bad influences such as focus position displacement, and makes transfer of the required pattern impossible. Further, if the density of the synthetic quartz glass at an irradiated portion is changed by irradiation with ultraviolet lights, a stress is included in the irradiated portion and a portion peripheral to the irradiated portion, and birefringence of the synthetic quartz glass changes. This change in the birefringence also exerts bad influences over image-formation performance of the projection lens, such being problematic.

The cause of the change in the density of the synthetic quartz glass by irradiation with ultraviolet lights is not clearly understood at present, however, several improvement methods have been proposed.

For example, JP-A-11-116248 proposes a process to incorporate fluorine at a concentration within a range of from 10 to 10,000 wtppm into a synthetic quartz glass and to make the synthetic quartz glass contain substantially no chlorine, thereby to suppress the compaction of the synthetic quartz glass upon the ultraviolet light irradiation. However, fluorine has influences over the refractive index of the synthetic quartz glass, and addition of fluorine in an amount of 1 wtppm to a synthetic quartz glass decreases the refractive index at 633 nm by about $4 \times 10^{-7}$. Although the compaction of the titan doped synthetic quartz glass is suppressed upon the ultraviolet light irradiation, it is very difficult to obtain uniformity of the refractive index. However, a synthetic quartz glass to be used for a lens material of a semiconductor exposure apparatus is required to have a uniformity of the refractive index of at most $2 \times 10^{-5}$. Accordingly, it is very difficult to apply a titan doped synthetic quartz glass to a lens material of a semiconductor exposure apparatus.

Further, JP-A-2000-191329 proposes a process for producing a synthetic quartz glass with a small amount of compaction. The production process disclosed in JP-A-2000-191329 is such that a porous quartz glass body synthesized by a VAD method is subjected to a heat treatment in an oxidizing atmosphere and then formed into a transparent glass, and the synthetic quartz glass block formed into a transparent glass is subjected to a heat treatment in a hydrogen gas-containing atmosphere to dope the quartz glass with hydrogen molecules. The synthetic quartz glass obtained by this process contains no oxygen deficient defects (≡Si—Si≡), and provides a small amount of compaction upon the ultraviolet light irradiation. According to this process, a synthetic quartz glass with a small amount of compaction can be obtained without impairing other characteristics such as uniformity of the refractive index. However, even the synthetic quartz glass obtained by this process undergoes rarefaction and its change in the refractive index is great in some cases depending upon the conditions of irradiation with ultraviolet lights, and the change in the refractive index of the synthetic quartz glass upon the ultraviolet light irradiation is not necessarily at a satisfactory level.

DISCLOSURE OF THE INVENTION

It is an object of the present invention to provide a synthetic quartz glass of which both the amount of the change in the transmittance and the amount of the change in the refractive index upon the ultraviolet light irradiation are stably small, and which is excellent in uniformity of the refractive index, and its production process.

As factors which may have influences over the amount of the change in the refractive index and the change in the transmittance of the synthetic quartz glass upon the ultraviolet light irradiation, (1) defects such as oxygen excess defects, oxygen deficient defects and reduction type defects (≡Si—H), (2) impurities such as dissolved oxygen, chlorine and OH groups and (3) additives such as fluorine and hydrogen may be mentioned. Accordingly, the present inventors have studied the influence of the respective factors over the change in the refractive index and the change in the transmittance of the synthetic quartz glass upon the ultraviolet light irradiation and as a result, have found the following.

The oxygen excess defects, the oxygen deficient defects and the reduction type defects (≡Si—H) in the synthetic quartz glass easily dissociate respectively in accordance with the reaction formulae (1), (2) and (3):

by irradiation with ultraviolet lights, and generate non-bridging oxygen radical (≡Si—O·) and E'center (≡Si·). Such paramagnetic defects have optical absorption bands centered in an ultraviolet region as described above, and accordingly the oxygen excess defects, the oxygen deficient defects and the reduction type defects in the synthetic quartz glass are causes of the decrease in the transmittance upon the ultraviolet light irradiation. However, the influences of the respective defects over the change in the refractive index upon the ultraviolet light irradiation are different. The oxygen excess defects and the reduction type defects have bad influences over the change in the refractive index by irradiation with ultraviolet lights (the higher the oxygen excess defect concentration or the reduction type defect concentration, the greater the change in the refractive index upon the ultraviolet light irradiation), however, the oxygen deficient defects do not have influences over the change in the refractive index upon the ultraviolet light irradiation.

With respect to the impurities, the present inventors have studied on three types of impurities i.e. dissolved oxygen, OH groups and chlorine. The dissolved oxygen and the OH groups are converted into peroxyradical (≡Si—O—O·) and non-bridging oxygen radical by the reactions of the formulae (4) and (5), respectively:

Both radicals have absorption bands centered in an ultraviolet region, and accordingly the dissolved oxygen and the OH group are one cause of the decrease in the transmittance upon the ultraviolet light irradiation. Further, both dissolved oxygen and OH groups have bad influences over the change in the refractive index upon the ultraviolet light irradiation, and the higher the concentration of the dissolved oxygen molecules or the OH groups, the greater the amount of the change in the refractive index upon the ultraviolet light irradiation. Further, with respect to chlorine, the E'center is formed by the reaction of the formula (6):

Accordingly, chlorine not only causes the decrease in the transmittance upon the ultraviolet light irradiation but also accelerates the change in the refractive index upon the ultraviolet light irradiation, particularly compaction in a case of irradiation at a relatively high pulse energy density.

Further, the present inventors have studied influences of fluorine and hydrogen as additives to the synthetic quartz glass. The synthetic quartz glass is doped with fluorine in a structure of ≡Si—F. The bonding energy of this bond is very high, and thus fluorine in the synthetic quartz glass has influences over neither the decrease in the transmittance nor the change in the refractive index upon the ultraviolet light irradiation. Further, with respect to hydrogen, it is dissolved in the synthetic quartz glass as hydrogen molecules. They restore the E'center and the non-bridging oxygen radical formed by irradiation with ultraviolet lights to suppress the decrease in the transmittance, and on the other hand, they have no influences over the change in the refractive index upon the ultraviolet light irradiation at all.

As mentioned above, the influences of the defects, impurities and additives in the synthetic quartz glass over the decrease in the transmittance and the change in the refractive index upon the ultraviolet-light irradiation are different. The cause and mechanism of the influences over the decrease in the transmittance of the synthetic quartz glass upon the ultraviolet light irradiation are clear to some extent as described above. On the other hand, the cause and mechanism of the influences over the change in the refractive index upon the ultraviolet light irradiation are not clear at present, but are estimated as follows. The cause of the change in the refractive index of the synthetic quartz glass upon the ultraviolet light irradiation is considered as e.g. formation of the defects or a change in the Si—O—Si bond angle distribution by rearrangement and recombination of the ≡Si—O—Si≡ bond.

All of the oxygen excess defects, the reduction type defects and the impurities (dissolved oxygen, OH groups and chlorine) in the synthetic quartz glass have a function to decrease the density of the synthetic quartz glass. It is considered that the lower the density of the synthetic quartz glass, the more the density of the synthetic quartz glass tends to change by the above formation of defects or the change in the structure due to irradiation with ultraviolet lights, and it is estimated that the change in the refractive index of the synthetic quartz glass upon the ultraviolet light irradiation tends to be significant if the synthetic quartz glass contains the oxygen excess defects, the reduction type defects and the impurities.

Further, fluorine is reported in the above JP-A-11-116248 to be effective to suppress the compaction upon the ultraviolet light irradiation. However, it is estimated that this effect is not a direct influence over the change of the refractive index upon the ultraviolet light irradiation but an indirect influence such that by addition of fluorine in the synthetic quartz glass, the concentrations of the oxygen excess defects and the dissolved oxygen molecules in the synthetic quartz glass which exert bad influences over the change in the refractive index upon the ultraviolet light irradiation are decreased, and resultingly the change in the refractive index upon the ultraviolet light irradiation is decreased.

According to the above results of studies, it is found that in order to suppress the decrease in the transmittance and the change in the refractive index upon the ultraviolet light irradiation, it is desirable to reduce the concentrations of the oxygen excess defects, the oxygen deficient defects, the reduction type defects, the dissolved oxygen molecules, the OH groups and chlorine in the synthetic quartz glass as far as possible. However, such a synthetic quartz glass is a synthetic quartz glass containing two oxygen atoms per one silicon atom, that is, an ideal synthetic quartz glass having a theoretical stoichiometric amount, and its realization is extremely difficult. Accordingly, from the results of studies on the relation of the composition of the synthetic quartz glass to the decrease in the transmittance and the change in the refractive index upon the ultraviolet light irradiation, the present inventors have found that both the decrease in the transmittance and the change in the refractive index upon the ultraviolet light irradiation can be stably suppressed simultaneously, with a synthetic quartz glass containing oxygen deficient defects to the extent of not exerting substantial influences over the decrease in the transmittance, and having the concentrations of the oxygen deficient defects, the dissolved oxygen molecules, the OH groups and chlorine reduced as far as possible.

Namely, the present invention resides in a synthetic quartz glass for an optical member to be used for an optical device employing a light having a wavelength of at most 400 nm and at least 170 nm as a light source, which contains substantially no oxygen excess defects nor dissolved oxygen molecules, and which contains oxygen deficient defects within a range of at most $5 \times 10^{14}$ defects/cm$^3$ and at least $1 \times 10^{13}$ defects/cm$^3$.

Further, the present invention resides in a synthetic quartz glass for an optical member to be used for an optical device employing a light having a wavelength of at most 400 nm and at least 170 nm as a light source, which contains substantially no oxygen excess defects, dissolved oxygen molecules nor reduction type defects, which has a chlorine concentration of at most 50 ppm and a OH group concentration of at most 100 ppm, and which contains oxygen deficient defects within a concentration range of at most $5 \times 10^{14}$ defects/cm$^3$ and at least $1 \times 10^{13}$ defects/cm$^3$.

BEST MODE FOR CARRYING OUT THE INVENTION

In the present invention, when the synthetic quartz glass contains substantially no oxygen excess defects nor dissolved oxygen molecules, the decrease in the transmittance and the change in the refractive index upon the ultraviolet light irradiation can be adequately suppressed. Here, "the synthetic quartz glass contains substantially no oxygen excess defects nor dissolved oxygen molecules" means that the concentrations as measured in the following detection methods are at most the limits of detection. The concentrations of the dissolved oxygen molecules can be measured by Raman spectroscopy in accordance with L. Skuja et. al., J. Appl. Phys., vol. 83, No. 11, p. 6106-6110 (1998). The limit of detection by this method is $1 \times 10^{17}$ molecules/cm$^3$. Further, the concentration of the oxygen excess defects can be evaluated by the OH group concentration which increases between before and after the heat treatment at from 700 to 1,000° C. in a hydrogen gas-containing atmosphere. For example, the amount of increase in the OH group concentration between before and after subjecting a synthetic quartz glass test specimen of $10 \times 10 \times 100$ mm to a heat treatment in an atmosphere of 100% hydrogen gas under a pressure of 101 kPa at 800° C. for 100 hours, is measured by an infrared spectrophotometer in accordance with Cer. Bull., 55 (5), 524, (1976). The limit of detection by this method is $1 \times 10^{16}$ groups/cm$^3$.

When the synthetic quartz glass contains substantially no reduction type defects, the decrease in the transmittance and the change in the refractive index upon the ultraviolet light irradiation can be suppressed to adequately low levels. Here, "contains substantially no reduction type defects" means that no peak in the vicinity of 2,250 cm$^{-1}$ attributable to SiH is observed in Raman spectroscopy.

With respect to the oxygen deficient defect concentration in the synthetic quartz glass, when the synthetic quartz glass contains the oxygen deficient defects within a concentration range of at most $5 \times 10^{14}$ defects/cm$^3$ and at least $1 \times 10^{13}$ defects/cm$^3$, the decrease in the transmittance upon the ultraviolet light irradiation can be adequately suppressed and at the same time, both introduction of the oxygen excess defects and inclusion of the dissolved oxygen molecules into the synthetic quartz glass can be prevented, and consequently the change in the refractive index of the synthetic quartz glass upon the ultraviolet light irradiation can be suppressed.

The concentration of the oxygen deficient defects in the synthetic quartz glass can be obtained from the intensity of blue photoluminescence with a peak in the vicinity of from 280 to 300 nm when irradiated with ultraviolet lights. Namely, the scattered light intensity of an ArF excimer laser beam and the peak intensity of blue photoluminescence centered in the vicinity of from 280 to 300 nm are measured by means of e.g. a fiber light guide type spectrophotometer equipped with multichannel photodiode (MCPD2000, manufactured by OTSUKA ELECTRONICS CO., LTD.), and when the proportion of the peak intensity of the blue photoluminescence to the scattered light at 193 nm is at most $5 \times 10^{-3}$ and at least $1 \times 10^{-4}$, it can be judged that the concentration of the oxygen deficient defects in the synthetic quartz glass is within the above range. If the intensity ratio exceeds $5 \times 10^{-3}$, the concentration of the oxygen deficient defects in the synthetic quartz glass exceeds $5 \times 10^{14}$ defects/cm$^3$, and the transmittance upon the ultraviolet light irradiation may decrease.

Further, if the intensity ratio is less than $1 \times 10^{-4}$, the oxygen deficient defect concentration is less than $1 \times 10^{13}$ defects/cm$^3$, and introduction of the oxygen excess defects and inclusion of the dissolved oxygen into the synthetic quartz glass may not adequately be prevented. Here, the relation between the intensity ratio and the oxygen deficient defect concentration was obtained by utilizing the absorption band centered at 163 nm due to the oxygen deficient defects. Namely, the oxygen deficient defect concentration was obtained by the absorption intensity at a wavelength of 163 nm in accordance with H. Hosono et. al., Phys. Rev. B44, p12043 (1991), and by measuring the blue photoluminescence intensity of a synthetic quartz glass sample the concentration of which has been known, the relation between the blue photoluminescence intensity ratio I to the scattered light at a wavelength of 193 nm and the oxygen deficient defect concentration $C_{ODC}$ (defects/cm$^3$) was obtained as a formula (7):

$$C_{ODC} = 1.16 \times 10^{17} \times I \quad \text{Formula (7)}$$

The change in the refractive index and the decrease in the transmittance upon the ultraviolet light irradiation can be suppressed to adequately low levels when the synthetic quartz glass has a chlorine concentration of at most 50 ppm, preferably at most 10 ppm, more preferably it contains substantially no chlorine. The chlorine concentration in the synthetic quartz glass can be measured by fluorescent X-ray. The limit of detection by this method is 10 ppm. If the chlorine concentration in the synthetic quartz glass exceeds the above range, the decrease in the transmittance and the change in the refractive index upon the ultraviolet light irradiation tend to be significant, such being unfavorable.

The change in the refractive index and the decrease in the transmittance upon the ultraviolet light irradiation can be suppressed to adequately low levels when the synthetic quartz glass has an OH group concentration of at most 100 ppm, preferably at most 50 ppm. The OH group concentration can be measured by an infrared spectrophotometer in accordance with Cer. Bull., 55 (5), 524, (1976). The limit of detection by this method is 1 ppm. If the OH group concentration in the synthetic quartz glass exceeds the above range, the decrease in the transmittance and the change in the refractive index upon the ultraviolet light irradiation tend to be significant, such being unfavorable.

Further, it is preferred that the synthetic quartz glass of the present invention contains hydrogen molecules within a range of from $5 \times 10^{15}$ molecules/cm$^3$ to $1 \times 10^{19}$ molecules/cm$^3$. As described above, the hydrogen molecules in the synthetic quartz glass have a function to repair the paramagnetic defects such as the E'center and the non-bridging oxygen radical formed by irradiation with ultraviolet lights, and have an effect to suppress the decrease in the transmittance upon the ultraviolet light irradiation.

In the present invention, metal impurities such as alkali metals (such as Na, K and Li), alkaline earth metals (such as Mg and Ca) and transition metals (such as Fe, Ni, Cr, Cu, Mo, W, Al, Ti and Ce) in the synthetic quartz glass not only decrease the light transmittance in an ultraviolet to vacuum ultraviolet region but cause deterioration of the durability to the light. Accordingly, their content is preferably as low as possible. Specifically, the total content of the metal impurities is preferably at most 100 ppb, particularly preferably at most 50 ppb.

In the present invention, the strained structures in the synthetic quartz glass are defects precursors of e.g. the E'center and the NBOHC to be formed by irradiation with ultraviolet lights, and accordingly the concentration is preferably low. Specifically, the ratios of the scattering peak intensity $I_{495}$ at 495 cm$^{-1}$ and the scattering peak intensity $I_{606}$ at 606 cm$^{-1}$, to the scattering peak intensity $I_{440}$ at 440 cm$^{-1}$ in the laser Raman spectrum, $I_{495}/I_{440}$ and $I_{606}/I_{440}$ are preferably at most 0.585 and at most 0.136, respectively.

Now, the process for producing the synthetic quartz glass of the present invention will be explained below.

The process to synthesize the synthetic quartz glass is to supply a compound containing Si as a synthesis material, oxygen gas, hydrogen gas, nitrogen gas etc. to a burner made of a quartz glass, and subjecting the synthesis material to hydrolysis and/or oxidation in oxyhydrogen flame to synthesis a quartz glass, and two types of methods i.e. a direct method and a VAD method (including soot method, OVD method and indirect method) may be mentioned.

The direct method is a synthesis method of subjecting a compound containing Si to flame hydrolysis at a temperature of from 1,500 to 2,000° C. to synthesize SiO$_2$ particles, and depositing and fusing them on a substrate to directly synthesize a transparent synthetic quartz glass. On the other hand, the VAD method is a method of subjecting a compound containing Si to flame hydrolysis at a temperature of from 1,000 to 1,500° C. to synthesize SiO$_2$ particles and depositing them on a substrate to firstly obtain a porous synthetic quartz glass body, and then increasing the temperature to from 1,400 to 1,500° C. to densify the porous synthetic quartz glass body to obtain a transparent synthetic quartz glass body.

The VAD method is preferred in view of relatively low reaction temperature at the time of synthesis and with a view to relatively freely controlling the composition and the defect concentrations. Particularly, due to the low reaction temperature at the time of synthesis, the chlorine concentration in the synthetic quartz glass synthesized by using a material containing chlorine such as SiCl$_4$, is lower by the VAD method than by the direct method, and the VAD method is preferred in this viewpoint also. Further, the synthesis material of the synthetic quartz glass is not particularly limited so long as it is a material capable of being gasified, and it may, for example, be a chloride such as SiCl$_4$, SiHCl$_3$, SiH$_2$Cl$_2$ or SiCH$_3$Cl$_3$, a halogenated silicone compound such as SiF$_4$, SiHF$_3$ or SiH$_2$F$_2$, or a silicon compound containing no halogen such as an alkoxysilane represented by $R_n\text{Si}(OR)_{4-n}$ (wherein R is a C$_{1-4}$ alkyl group, and n is an integer of from 0 to 3) or (CH$_3$)$_3$Si—O—Si(CH$_3$)$_3$.

When a chloride is used as the synthesis material, chlorine in the synthesis material remains in the synthetic quartz glass, and thus preferred as the synthesis material is an organic silicon compound or a fluoride, containing no chlorine. However, if a fluoride is used as the synthesis material, hydrofluoric acid (HF) forms as a reaction by-product at the time of synthesis, such being problematic in view of safety and handling efficiency; Accordingly, as the synthesis material, an organic silicon compound containing no halogen is preferred.

In a case where the synthetic quartz glass is synthesized by the VAD method, the concentrations of the oxygen excess defects, the dissolved hydrogen molecules and the oxygen deficient defects in the synthetic quartz glass can be controlled by several methods.

Specifically, (1) a method of adjusting the supply proportion of the oxygen gas and the hydrogen gas in the synthesis material gas, (2) a method of treating the porous synthetic quartz glass body by a reducing compound such as a compound containing fluorine or chlorine, or (3) a method of adjusting the conditions when the porous synthetic quartz glass body is densified to the transparent synthetic quartz glass body, may be mentioned.

The method (1) is a method of setting the proportion of the hydrogen gas to the oxygen gas in the synthesis material gas to be a value higher than the stoichiometric ratio 2, i.e. within a range of from 2.0 to 2.5 to synthesize the porous synthetic quartz glass.

The method (2) is to subject the porous synthetic quartz glass body to a heat treatment in an atmosphere which contains a compound containing fluorine or chlorine or a reducing compound such as a hydrogen gas or a CO gas at a temperature of from room temperature to 1,200° C. The compound containing fluorine may, for example, be $CF_4$, $SiF_4$ or $SF_6$, and the compound containing chlorine may, for example, be $CCl_4$ or $Cl_2$. When the compound containing fluorine or chlorine, or the CO gas is used, since such a gas has extremely high reduction properties, it is preferred to use a mixed gas diluted to a range of from 0.01 to 10 vol %, preferably from 0.05 to 5 vol % by means of an inert gas (such as nitrogen, helium or argon), and the treatment temperature is preferably from room temperature to about 1,000° C., and the ambient pressure is preferably from 1 kPa to 101 kPa.

Further, in a case where the hydrogen gas is used, it is preferred to carry out the heat treatment with an inert gas containing a hydrogen gas in an amount of from 50 to 100 vol % under from 101 to 1,013 kPa at from 800 to 1,200° C. The porous synthetic quartz glass body is set in a reducing atmosphere first, and then the gas is introduced from the above state until the pressure reaches a predetermined pressure, whereby the porous synthetic quartz glass can be treated uniformly with high efficiency.

Further, the method (3) is a method of holding the synthesized porous synthetic quartz glass body in a graphite furnace capable of adjusting the atmosphere and employing high purity carbon as a heater and as an insulating material, or a metal furnace employing W or Mo as a reflector and as a heater, in an atmosphere of 100 vol % inert gas such as helium or nitrogen under a reduced pressure of from 10 Pa to 10 kPa at a temperature of from 1,100 to 1,300° C., preferably from 1,200 to 1,300° C. for from 20 to 200 hours, and then increasing the temperature to from 1,400 to 1,500° C. under the same atmosphere for densification to obtain a transparent synthetic quartz glass body.

The concentrations of the oxygen excess defects, the dissolved oxygen molecules and the oxygen deficient defects in the synthetic quartz glass can be controlled by carrying out one or a combination of the above-described three methods.

EXAMPLES

Now, the present invention will be explained in further detail with reference to Examples of the present invention and Comparative Examples. However, the present invention is by no means restricted to such specific Examples.

Examples 1 to 23

Figure 1:
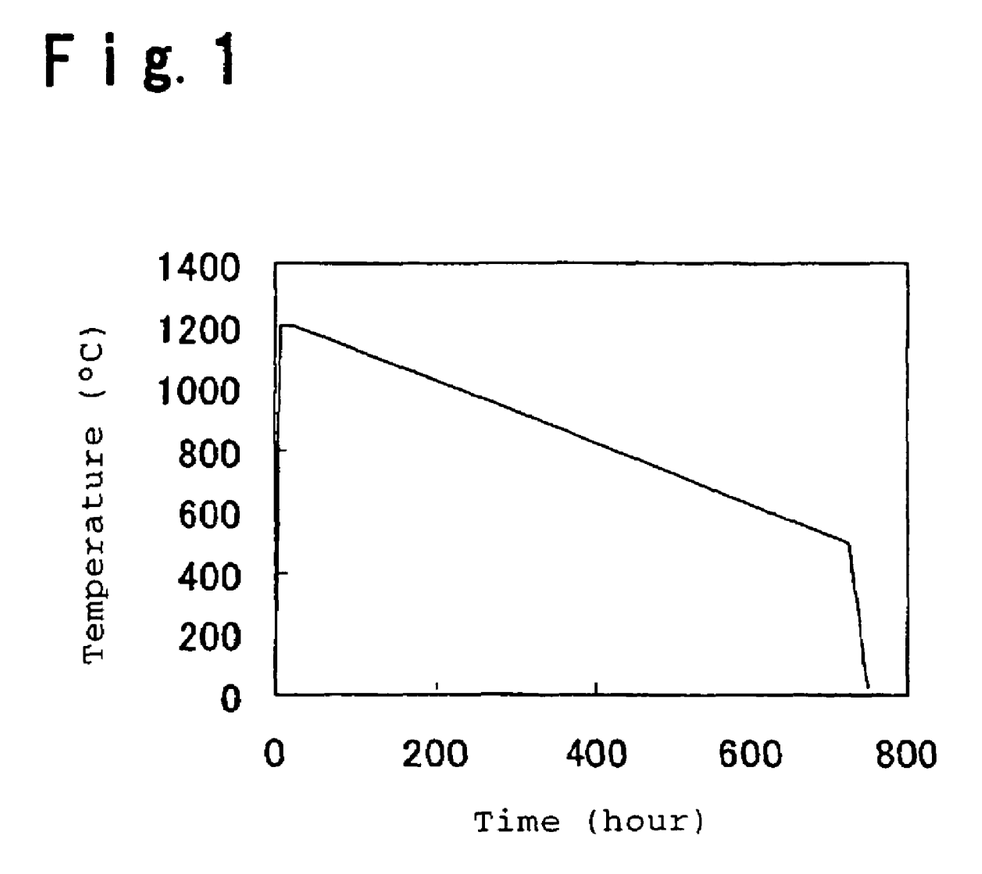
FIG. 1 is a graph illustrating the temperature profile of the heat treatment of the synthetic quartz glass in Examples of the present invention.

Employing the material and the proportion of a hydrogen gas to an oxygen gas as shown in Table 1, a porous synthetic quartz glass body is prepared by oxyhydrogen flame hydrolysis method (VAD method), and the obtained porous synthetic quartz glass is installed in a tubular electric furnace capable of controlling the atmosphere and employing a molten quartz glass tube as a core tube. Then, the synthetic quartz glass body is subjected to a heat treatment under conditions as shown in Table 1. Then, the porous synthetic quartz glass is installed in a graphite furnace and subjected to a heat treatment under conditions as shown in Table 1 to obtain a transparent synthetic quartz glass block (diameter 200 mm×length 600 mm). The obtained synthetic quartz glass block is installed in a mold made of graphite having a diameter of 400 mm, and the temperature is increased to 1,750° C. in an atmosphere of 100% argon gas under 101 kPa to form the glass block into a diameter of 400 mm. Then, the glass block is immersed in a 5 wt % hydrofluoric acid aqueous solution for 20 hours to remove the layer stained with impurities on the surface by etching, followed by drying. Then, the synthetic quartz glass block is subjected to annealing in accordance with the temperature program as shown in FIG. 1 (the synthetic quartz glass block is heated from room temperature to 1,200° C. over a period of 5 hours, held at 1,200° C. for 20 hours, annealed from 1,200° C. to 500° C. at 1° C./hr and cooled from 500° C. to 25° C. over a period of 24 hours) in an atmosphere of 100% nitrogen under 101 kPa for uniformalization. Then, the two faces having a diameter of 400 mm are ground until the thickness becomes 120 mm, and then the synthetic quartz glass block is immersed in the hydrofluoric acid aqueous solution under the same conditions as described above to remove the layer stained with impurities on the surface by etching, followed by drying. Then, the synthetic quartz glass block is held in an atmosphere under a pressure as shown in Table 1 at 500° C. for 400 hours to carry out a hydrogen doping treatment.

Examples 24 to 26

Employing the material and the proportion of a hydrogen gas to an oxygen gas as shown in Table 1, a transparent synthetic quartz glass block (diameter 200 mm×length 600 mm) is directly prepared by oxyhydrogen flame hydrolysis method (direct method). The obtained synthetic quartz glass block is installed in a mold made of graphite having a diameter of 400 mm, and the temperature is increased to 1,750° C. in an atmosphere of 100% argon gas under 101 kPa to form the glass block into a diameter of 400 mm. Then, the synthetic quartz glass block is immersed in a 5 wt % hydrofluoric acid aqueous solution for 20 hours to remove the layer stained with impurities on the surface by etching, followed by drying. Then, the synthetic quartz glass block is subjected to annealing in accordance with the temperature program as shown in FIG. 1 in an atmosphere of 100% nitrogen under 101 kPa for uniformalization. Then, the two faces having a diameter of 400 mm of the synthetic quartz glass block are ground until the thickness becomes 120 mm.

The following evaluations are carried out with respect to the synthetic quartz glass block obtained via the above steps.

Evaluation 1: Oxygen excess defect concentration

A test specimen of 10 mm square×100 mm length is cut out from a portion in the vicinity of the center of the synthetic quartz glass block, the test specimen is subjected to a heat treatment of holding it in an atmosphere of 100% hydrogen gas under 101 kPa at 800° C. for 100 hours, and the OH group concentration increased between before and after the heat treatment is measured by an infrared spectrophotometer in accordance with Cer. Bull., 55 (5), 524, (1976). The oxygen excess defect concentration $C_{POL}$ (defects/cm$^3$) is calculated from the increased OH group concentration $\Delta C_{OH}$ (groups/cm$^3$) in accordance with the formula (8):

$$C_{POL} = \Delta C_{OH} \times 0.5 \tag{8}$$

The limit of detection by this method is $1 \times 10^{16}$ defects/cm$^3$.

Evaluation 2: Dissolved oxygen molecule concentration

A test specimen of 20 mm square×10 mm length is cut out from a portion in the vicinity of the center of the synthetic quartz glass block, and the two faces of 20 mm square of the test specimen are subjected to mirror polishing. Then, the dissolved oxygen molecule concentration is measured by a Raman spectrophotometer in accordance with L. Skuja et. al., J. Appl. Phys., vol. 83, No. 11, p 6106-6110 (1998). The limit of detection by this method is $1 \times 10^{17}$ molecules/cm$^3$.

Evaluation 3: Oxygen deficient defect concentration

A test specimen of 20 mm square×10 mm length is cut out from a portion in the vicinity of the center of the synthetic quartz glass block, and the two faces of 20 mm square and one face of 20×10 mm of the test specimen are subjected to mirror polishing. Then, the face of 20 mm square is perpeidicularly irradiated with an ArF excimer laser beam (pulse energy density 20 mJ/cm$^2$/pulse, frequency 300 Hz), a beam-condensing fiber of a spectroscope equipped with multichannel photodiode (MCPD3000, manufactured by OTSUKA ELECTRONICS CO., LTD.) is pressed against the face of 20×10 mm, and the intensity $I_{193}$ of the scattered light of the ArF excimer laser from the synthetic quartz glass and the intensity of the photoluminescence at a wavelength of from 200 to 800 nm, each generated upon the ArF excimer laser beam irradiation, are measured to obtain the ratio of the peak intensity $I_{photoluminescence}$ of blue photoluminescence with a peak in the vicinity of a wavelength of 280 nm to the scattered light intensity $I_{193}$ of the excitation light (ArF excimer laser beam), $I_{photoluminescence}/I_{193}$, whereby the concentration of the oxygen deficient defects is calculated from the formula (7). The limit of detection by this method is $1 \times 10^{13}$ defects/cm$^3$ as the concentration of the oxygen deficient defects.

Evaluation 4: Reduction type defect concentration

A test specimen of 20 mm square×10 mm length is cut out from a portion in the vicinity of the center of the synthetic quartz glass block, and the two faces of 20 mm square and one face of 20×10 mm of the test specimen are subjected to mirror polishing. Then, the Raman spectrum is measured by means of a Raman spectrophotometer (Ramonor T64000 manufactured by Jobin Yvon, excitation light source: argon ion laser (wavelength 514.5 nm)) to evaluate the peak intensity in the vicinity of 2,250 cm$^{-1}$ attributable to SiH. Namely, quantitative analysis is carried out by the value $I_{2250}/I_{800}$ obtained by dividing the peak intensity $I_{2250}$ attributable to SiH at 2,250 cm$^{-1}$ by the peak intensity $I_{800}$ by the fundamental vibration of the bond between a silicon atom and an oxygen atom at 800 cm$^{-1}$. The limit of detection by this method is $1 \times 10^{-4}$ as $I_{2250}/I_{800}$.

Evaluation 5: OH group concentration

With respect to a portion in the vicinity of the center of the synthetic quartz glass block, measurement is carried out by an infrared spectrophotometer of a fiber light guide type (manufactured by Yokogawa Electric Corporation), and the OH group content is obtained from the absorption peak at a wavelength of 2.7 μm (J. P. Wiliams et. al., Ceramic Bulletin, 55 (5), 524, 1976). The limit of detection by this method is 0.3 ppm.

Evaluation 6: Fluorine concentration

The fluorine content at a portion in the vicinity of the center of the synthetic quartz glass block is analyzed by a fluorine ion electrode method. The method of analyzing the fluorine content is as follows. In accordance with the method as disclosed in Nippon Kagakukaishi (published by the Chemical Society of Japan, 1972 (2), p. 350), the synthetic quartz glass is melted by heating by anhydrous sodium carbonate, and distilled water and hydrochloric acid (volume ratio 1:1) are added to the obtained melt to prepare a sample liquid. The electromotive force of the sample liquid is measured by means of a radiometer employing as a fluorine ion selective electrode and as a comparative electrode No. 945-220 and No. 945-468 manufactured by Radiometer Trading K.K., respectively. Then, the fluorine content is obtained based on an analytical curve preliminarily prepared by using a fluorine ion standard solution. The limit of detection by this method is 10 ppm.

Evaluation 7: Chlorine concentration

A sample of 20 mm square×10 mm thickness is cut out from a portion in the vicinity of the center of the synthetic quartz glass block, and one face of 20 mm square is subjected to mirror polishing. Fluorescent X-ray analysis is carried out with respect to the face subjected to mirror polishing, to obtain the chlorine content in the synthetic quartz glass. The limit of detection by this method is 10 ppm.

Evaluation 8: Hydrogen molecule concentration

A test specimen of 10 mm square×1 mm thickness is cut out from a portion in the vicinity of the center of the synthetic quartz glass block, and the two faces of 10 mm square and the four faces of 10 mm×1 mm of the test specimen are subjected to mirror polishing. The prepared sample is heated from room temperature to 1,500° C. over a period of about 60 minutes. The ion intensity of the hydrogen gas emitted from the test specimen during the heat increase is measured to evaluate the hydrogen molecule concentration in the test specimen. The limit of detection by this method is $5 \times 10^{15}$ molecules/cm$^3$. Here, the hydrogen molecule concentration in the synthetic quartz glass can not be directly obtained by this method. Accordingly, temperature programmed desorption mass spectrometry is carried out with respect to a sample, the hydrogen molecule concentration of which is known by preliminarily carrying out Raman spectrometry, to preliminarily obtain the correlation between the hydrogen molecule concentration by Raman spectrometry and the gas ion intensity by temperature programmed desorption mass spectrometry, and this correlation is employed.

The method of evaluating the hydrogen molecule concentration by Raman spectrometry is as follows. The hydrogen molecule content (molecules/cm$^3$) is obtained from the intensity ratio ($I_{4160}/I_{800}$) of the intensity $I_{4160}$ detected from the Raman scattering peak at 4,135 cm$^{-1}$ in the laser Raman spectrum to the intensity $I_{800}$ of the scattering peak at 800 cm$^{-1}$ representing the fundamental vibration between silicon and oxygen (V. S. Khotimchenko, et. al., Zhurnal Prikladnoi Spektroskopii, Vol. 46, No. 6, pp. 987-997, 1986). The limit of detection by this method is $3 \times 10^{16}$ molecules/cm$^3$.

Evaluation 9: Uniformity of refractive index

The face having a diameter of 400 mm of the synthetic quartz glass block is perpendicularly irradiated with a HeNe laser beam (wavelength 633 nm) by using a Fizeau interferometer (Mark IV manufactured by Zygo Corporation) by means of an oil-on plate method, and the uniformity of the refractive index (PV value) in the center area with a diameter of 360 mm is measured.

Evaluation 10: Durability to the light against high energy light

A test specimen of 30 mm square×100 mm is cut out from substantially the center portion of the synthetic quartz glass block, and facing two faces of 30 mm square are subjected to mirror polishing with a wedge at an angle of 5 minutes. Then, the face of 30 mm square is perpendicularly irradiated with an ArF excimer laser beam (pulse energy density 0.2 mJ/cm$^2$/pulse, frequency 2 kHz) for $10^{10}$ pulses, and the change in the refractive index by irradiation is measured by Fizeau interferometer (GPI-XP, manufactured by Zygo Corporation). Further, the intensity $I_{in}$, of a light which enters the test specimen and the intensity $I_{out}$ of a light which exits from the test specimen are measured each with respect to an irradiated portion and a non-irradiated portion, and the ratios ($I_{out}/I_{in}$) are compared in accordance with the formula (9) to evaluate the decrease ΔT in the transmittance at a wavelength of 193 nm by irradiation:

$$\Delta T (\%/cm) = (_{out}I_{in} \text{ (non-irradiated portion)} - I_{out}/I_{in} \text{ (irradiated portion)}) \times 10 \quad (9)$$

The limits of detection of the change in the refractive index and the decrease in the transmittance by this method are $1 \times 10^{-8}$ and $1 \times 10^{-2}\%$ /cm; respectively.

Evaluation 11: Durability to the light against low energy light

A test specimen of 30 mm square×100 mm is cut out from substantially the center portion of the synthetic quartz glass block, and facing two faces of 30 mm square are subjected to mirror polishing with a wedge at an angle of 5 minutes. Then, the face of 30 mm square is perpendicularly irradiated with an ArF excimer laser beam (pulse energy density 0.01 mJ/cm²/pulse, frequency 2 kHz) for $10^{10}$ pulses, and the change in the refractive index by irradiation is measured by Fizeau interferometer (GPI-XP, manufactured by Zygo Corporation). Further, the intensity $I_{in}$ of a light which enters the test specimen and the intensity $I_{out}$ of a light which exits from the test specimen are measured each with respect to an irradiated portion and a non-irradiated portion, and the ratios ($I_{out}/I_{in}$) are compared in accordance with the formula (9) to evaluate the decrease ΔT in the transmittance at a wavelength of 193 nm by irradiation.

The evaluation results are shown in Table 2. Examples 3 to 5, 7 to 9 and 11 to 23 are Examples of the present invention, and the others are Comparative Examples.

TABLE 1

| | Source material | Proportion of hydrogen gas/oxygen gas in synthesis material gas | Conditions of treatment of porous synthetic quartz glass (atmosphere, pressure, temperature × time) | Conditions of formation of transparent glass (atmosphere, pressure, temperature × time) | Hydrogen treatment conditions (atmosphere, pressure, temperature) |
|---|---|---|---|---|---|
| Ex. 1 | SiCl₄ | 1.7 | Nil | He/O₂ = 95/5 vol %, 101 kPa, 1,450° C. × 20 hr | H₂ = 100 vol % 1010 kPa, 500° C. |
| Ex. 2 | SiCl₄ | 1.7 | Nil | He = 100 vol %, 101 kPa, 1,450° C. × 20 hr | H₂ = 100 vol % 1010 kPa, 500° C. |
| Ex. 3 | SiCl₄ | 1.9 | Nil | He = 100 vol %, 100 Pa, 1,450° C. × 20 hr | H₂ = 100 vol % 1010 kPa, 500° C. |
| Ex. 4 | SiCl₄ | 2.1 | Nil | He = 100 vol %, 100 Pa, 1,250° C. × 20 hr then 1,450° C. × 20 hr | H₂ = 100 vol % 1010 kPa, 500° C. |
| Ex. 5 | SiCl₄ | 2.3 | Nil | He = 100 vol %, 100 Pa, 1,250° C. × 20 hr then 1,450° C. × 20 hr | H₂ = 100 vol % 1010 kPa, 500° C. |
| Ex. 6 | SiCl₄ | 1.9 | SiF₄/He = 10/90 vol %, 101 kPa, 700° C. × 5 hr | He = 100 vol %, 100 Pa, 1,250° C. × 50 hr then 1,450° C. × 20 hr | H₂ = 100 vol % 1010 kPa, 500° C. |
| Ex. 7 | SiCl₄ | 1.9 | SiF₄/He = 1/99 vol %, 101 kPa, 25° C. × 5 hr | He = 100 vol %, 100 Pa, 1,250° C. × 50 hr then 1,450° C. × 20 hr | H₂ = 100 vol % 1010 kPa, 500° C. |
| Ex. 8 | SiCl₄ | 1.9 | SiF₄/He = 0.3/99.7 vol %, 101 kPa, 500° C. × 3 hr | He = 100 vol %, 100 Pa, 1,250° C. × 50 hr then 1,450° C. × 20 hr | H₂ = 100 vol % 1010 kPa, 500° C. |
| Ex. 9 | SiCl₄ | 1.9 | SiF₄/He = 0.1/99.9 vol %, 101 kPa, 900° C. × 3 hr | He = 100 vol %, 100 Pa, 1,250° C. × 50 hr then 1,450° C. × 20 hr | H₂ = 100 vol % 1010 kPa, 500° C. |
| Ex. 10 | SiCl₄ | 1.9 | Cl₂/He = 1/99 vol %, 101 kPa, 700° C. × 5 hr | He = 100 vol %, 100 Pa, 1,250° C. × 50 hr then 1,450° C. × 20 hr | H₂ = 100 vol % 1010 kPa, 500° C. |
| Ex. 11 | SiCl₄ | 1.9 | Cl₂/He = 0.1/99.9 vol %, 101 kPa, 600° C. × 3 hr | He = 100 vol %, 100 Pa, 1,250° C. × 50 hr then 1,450° C. × 20 hr | H₂ = 100 vol % 1010 kPa, 500° C. |
| Ex. 12 | SiCl₄ | 1.9 | CO/He = 0.5/99.5 vol %, 101 kPa, 600° C. × 5 hr | He = 100 vol %, 100 Pa, 1,250° C. × 50 hr then 1,450° C. × 20 hr | H₂ = 100 vol % 1010 kPa, 500° C. |
| Ex. 13 | SiCl₄ | 1.9 | H₂ = 100 vol %, 1010 kPa, 1,200° C. × 10 hr | He = 100 vol %, 100 Pa, 1,250° C. × 50 hr then 1,450° C. × 20 hr | H₂ = 100 vol % 1010 kPa, 500° C. |
| Ex. 14 | SiCl₄ | 1.9 | H₂ = 100 vol %, 1010 kPa, 1,200° C. × 10 hr | He = 100 vol %, 100 Pa, 1,250° C. × 50 hr then 1,450° C. × 20 hr | H₂ = 100 vol %, 1010 kPa, 500° C. |
| Ex. 15 | SiCl₄ | 1.9 | Nil | He = 100 vol %, 100 Pa, 1,250° C. × 50 hr then 1,450° C. × 20 hr | H₂ = 100 vol %, 1010 kPa, 500° C. |
| Ex. 16 | SiCl₄ | 1.9 | Nil | He = 100 vol %, 100 Pa, 1,250° C. × 100 hr then 1,450° C. × 20 hr | H₂ = 100 vol %, 1010 kPa, 500° C. |
| Ex. 17 | HMDS | 1.9 | Nil | He = 100 vol %, 100 Pa, 1,250° C. × 100 hr then 1,450° C. × 20 hr | H₂ = 100 vol %, 1010 kPa, 500° C. |
| Ex. 18 | SiCl₄ | 1.9 | Nil | He = 100 vol %, 100 Pa, 1,250° C. × 100 hr then 1,450° C. × 20 hr | H₂ = 100 vol %, 101 kPa, 500° C. |
| Ex. 19 | SiCl₄ | 1.9 | Nil | He = 100 vol %, 100 Pa, 1,250° C. × 100 hr then 1,450° C. × 20 hr | H₂/He = 10/90 vol %, 101 kPa, 500° C. |
| Ex. 20 | SiCl₄ | 1.9 | Nil | He = 100 vol %, 100 Pa, 1,250° C. × 100 hr then 1,450° C. × 20 hr | H₂/He = 2/98 vol %, 101 kPa, 500° C. |
| Ex. 21 | SiCl₄ | 1.9 | Nil | He = 100 vol %, 100 Pa, 1,250° C. × 100 hr then 1,450° C. × 20 hr | H₂/He = 0.1/99.9 vol %, 101 kPa, 500° C. |
| Ex. 22 | SiCl₄ | 1.9 | Nil | He = 100 vol %, 100 Pa, 1,250° C. × 100 hr then 1,450° C. × 20 hr | Nil |
| Ex. 23 | SiCl₄ | 1.9 | Nil | He = 100 vol %, 100 Pa, 1,250° C. × 100 hr then 1,450° C. × 20 hr | H₂ = 100 vol %, 1010 kPa, 700° C. |
| Ex. 24 | SiCl₄ | 1.9 | Nil | Nil | Nil |
| Ex. 25 | SiCl₄ | 1.7 | Nil | Nil | Nil |
| Ex. 26 | HMDS/SiF₄ | 2.5 | Nil | Nil | Nil |

TABLE 1-continued

| Source material | Proportion of hydrogen gas/oxygen gas in synthesis material gas | Conditions of treatment of porous synthetic quartz glass (atmosphere, pressure, temperature × time) | Conditions of formation of transparent glass (atmosphere, pressure, temperature × time) | Hydrogen treatment conditions (atmosphere, pressure, temperature) |
|---|---|---|---|---|
| | | | | |

TABLE 2

| Unit | Evaluation 1 Oxygen excess defect concentration defects/cm$^3$ | Evaluation 2 Dissolved oxygen molecule concentration molecules/cm$^3$ | Evaluation 3 Oxygen deficient defect concentration defects/cm$^3$ | Evaluation 4 Reduction type defect concentration defects/cm$^3$ |
|---|---|---|---|---|
| Ex. 1 | $5.4 \times 10^{17}$ | $7.1 \times 10^{17}$ | $<1 \times 10^{13}$ | $<1 \times 10^{-4}$ |
| Ex. 2 | $2.9 \times 10^{16}$ | $<1 \times 10^{17}$ | $<1 \times 10^{13}$ | $<1 \times 10^{-4}$ |
| Ex. 3 | $<1 \times 10^{16}$ | $<1 \times 10^{17}$ | $1 \times 10^{13}$ | $<1 \times 10^{-4}$ |
| Ex. 4 | $<1 \times 10^{16}$ | $<1 \times 10^{17}$ | $2 \times 10^{13}$ | $<1 \times 10^{-4}$ |
| Ex. 5 | $<1 \times 10^{16}$ | $<1 \times 10^{17}$ | $3 \times 10^{13}$ | $<1 \times 10^{-4}$ |
| Ex. 6 | $<1 \times 10^{16}$ | $<1 \times 10^{17}$ | $1.5 \times 10^{17}$ | $<1 \times 10^{-4}$ |
| Ex. 7 | $<1 \times 10^{16}$ | $<1 \times 10^{17}$ | $2 \times 10^{13}$ | $<1 \times 10^{-4}$ |
| Ex. 8 | $<1 \times 10^{16}$ | $<1 \times 10^{17}$ | $5 \times 10^{13}$ | $<1 \times 10^{-4}$ |
| Ex. 9 | $<1 \times 10^{16}$ | $<1 \times 10^{17}$ | $3.0 \times 10^{14}$ | $<1 \times 10^{-4}$ |
| Ex. 10 | $<1 \times 10^{16}$ | $<1 \times 10^{17}$ | $3.2 \times 10^{15}$ | $<1 \times 10^{-4}$ |
| Ex. 11 | $<1 \times 10^{16}$ | $<1 \times 10^{17}$ | $4.0 \times 10^{14}$ | $<1 \times 10^{-4}$ |
| Ex. 12 | $<1 \times 10^{16}$ | $<1 \times 10^{17}$ | $4.0 \times 10^{14}$ | $<1 \times 10^{-4}$ |
| Ex. 13 | $<1 \times 10^{16}$ | $<1 \times 10^{17}$ | $2.0 \times 10^{14}$ | $<1 \times 10^{-4}$ |
| Ex. 14 | $<1 \times 10^{16}$ | $<1 \times 10^{17}$ | $2.0 \times 10^{14}$ | $1.2 \times 10^{-2}$ |
| Ex. 15 | $<1 \times 10^{16}$ | $<1 \times 10^{17}$ | $3 \times 10^{13}$ | $<1 \times 10^{-4}$ |
| Ex. 16 | $<1 \times 10^{16}$ | $<1 \times 10^{17}$ | $5 \times 10^{13}$ | $<1 \times 10^{-4}$ |
| Ex. 17 | $<1 \times 10^{16}$ | $<1 \times 10^{17}$ | $5 \times 10^{13}$ | $<1 \times 10^{-4}$ |
| Ex. 18 | $<1 \times 10^{16}$ | $<1 \times 10^{17}$ | $5 \times 10^{13}$ | $<1 \times 10^{-4}$ |
| Ex. 19 | $<1 \times 10^{16}$ | $<1 \times 10^{17}$ | $5 \times 10^{13}$ | $<1 \times 10^{-4}$ |
| Ex. 20 | $<1 \times 10^{16}$ | $<1 \times 10^{17}$ | $5 \times 10^{13}$ | $<1 \times 10^{-4}$ |
| Ex. 21 | $<1 \times 10^{16}$ | $<1 \times 10^{17}$ | $5 \times 10^{13}$ | $<1 \times 10^{-4}$ |
| Ex. 22 | $<1 \times 10^{16}$ | $<1 \times 10^{17}$ | $5 \times 10^{13}$ | $<1 \times 10^{-4}$ |
| Ex. 23 | $<1 \times 10^{16}$ | $<1 \times 10^{17}$ | $5 \times 10^{13}$ | $3.5 \times 10^{-3}$ |
| Ex. 24 | $<1 \times 10^{16}$ | $<1 \times 10^{17}$ | $<1 \times 10^{13}$ | $<1 \times 10^{-4}$ |
| Ex. 25 | $<1 \times 10^{16}$ | $<1 \times 10^{17}$ | $<1 \times 10^{13}$ | $4.5 \times 10^{-4}$ |
| Ex. 26 | $<1 \times 10^{16}$ | $<1 \times 10^{17}$ | $<1 \times 10^{13}$ | $<1 \times 10^{-4}$ |

| Unit | Evaluation 5 OH group concentration ppm | Evaluation 6 Fluorine concentration ppm | Evaluation 7 Chlorine concentration ppm | Evaluation 8 Hydrogen molecule concentration molecules/cm$^3$ |
|---|---|---|---|---|
| Ex. 1 | 240 | <5 | 15 | $3 \times 10^{18}$ |
| Ex. 2 | 120 | <5 | 15 | $3 \times 10^{18}$ |
| Ex. 3 | 70 | <5 | 15 | $3 \times 10^{18}$ |
| Ex. 4 | 64 | <5 | 15 | $3 \times 10^{18}$ |
| Ex. 5 | 53 | <5 | 15 | $3 \times 10^{18}$ |
| Ex. 6 | <1 | 2100 | <10 | $3 \times 10^{18}$ |
| Ex. 7 | 8 | 35 | 12 | $3 \times 10^{18}$ |
| Ex. 8 | 6 | 40 | 13 | $3 \times 10^{18}$ |
| Ex. 9 | <1 | 25 | 12 | $3 \times 10^{18}$ |
| Ex. 10 | <1 | <5 | 270 | $3 \times 10^{18}$ |
| Ex. 11 | 5 | <5 | 35 | $3 \times 10^{18}$ |
| Ex. 12 | 2 | <5 | 15 | $3 \times 10^{18}$ |
| Ex. 13 | 8 | <5 | 15 | $3 \times 10^{18}$ |
| Ex. 14 | <1 | <5 | 15 | $3 \times 10^{18}$ |
| Ex. 15 | 40 | <5 | 15 | $3 \times 10^{18}$ |
| Ex. 16 | 25 | <5 | 15 | $3 \times 10^{18}$ |
| Ex. 17 | 28 | <5 | <10 | $3 \times 10^{18}$ |
| Ex. 18 | 25 | <5 | 15 | $3 \times 10^{17}$ |
| Ex. 19 | 25 | <5 | 15 | $3 \times 10^{16}$ |
| Ex. 20 | 25 | <5 | 15 | $6 \times 10^{15}$ |
| Ex. 21 | 25 | <5 | 15 | $<5 \times 10^{15}$ |
| Ex. 22 | 26 | <5 | 15 | $<5 \times 10^{15}$ |
| Ex. 23 | 25 | <5 | 15 | $2 \times 10^{17}$ |
| Ex. 24 | 780 | <5 | 68 | $3 \times 10^{18}$ |
| Ex. 25 | 480 | <5 | 68 | $3 \times 10^{18}$ |
| Ex. 26 | 800 | 500 | <10 | $3 \times 10^{18}$ |

| Evaluation 9 | Evaluation 10 | Evaluation 11 |
|---|---|---|

TABLE 2-continued

| Unit | Uniformity of refractive index ppm | Change in refractive index ppb | Change in transmittance %/cm | Change in refractive index ppb | Decrease in transmittance %/cm |
|---|---|---|---|---|---|
| Ex. 1 | 12.3 | 290 | 0.09 | −27 | <0.01 |
| Ex. 2 | 66.3 | 180 | 0.05 | −13 | <0.01 |
| Ex. 3 | 3.2 | 100 | 0.03 | <10 | <0.01 |
| Ex. 4 | 2.9 | 98 | 0.03 | <10 | <0.01 |
| Ex. 5 | 2.7 | 97 | 0.03 | <10 | <0.01 |
| Ex. 6 | 83.1 | 17 | 0.30 | <10 | 0.29 |
| Ex. 7 | 8.5 | 50 | 0.03 | <10 | <0.01 |
| Ex. 8 | 9.3 | 48 | 0.03 | <10 | <0.01 |
| Ex. 9 | 7.3 | 42 | 0.03 | <10 | <0.01 |
| Ex. 10 | 15.8 | 42 | 0.57 | <10 | 0.59 |
| Ex. 11 | 1.5 | 47 | 0.03 | <10 | <0.01 |
| Ex. 12 | 0.9 | 44 | 0.03 | <10 | <0.01 |
| Ex. 13 | 1.1 | 50 | 0.03 | <10 | <0.01 |
| Ex. 14 | 0.9 | 83 | 0.53 | <10 | 0.53 |
| Ex. 15 | 0.9 | 83 | 0.03 | <10 | <0.01 |
| Ex. 16 | 0.8 | 68 | 0.03 | <10 | <0.01 |
| Ex. 17 | 0.7 | 35 | 0.02 | <10 | <0.01 |
| Ex. 18 | 0.8 | 68 | 0.03 | <10 | <0.01 |
| Ex. 19 | 0.8 | 68 | 0.03 | <10 | <0.01 |
| Ex. 20 | 0.8 | 68 | 0.03 | <10 | <0.01 |
| Ex. 21 | 0.8 | 68 | 0.32 | <10 | <0.01 |
| Ex. 22 | 0.8 | 69 | 3.81 | <10 | <0.01 |
| Ex. 23 | 0.8 | 88 | 0.13 | <10 | 0.13 |
| Ex. 24 | 5.6 | 200 | 0.10 | −59 | <0.01 |
| Ex. 25 | 2.3 | 130 | 0.09 | −43 | <0.01 |
| Ex. 26 | 29.9 | 67 | 0.03 | −35 | <0.01 |

INDUSTRIAL APPLICABILITY

The synthetic quartz glass of the present invention can be used for an optical member to be used for an optical device employing a light having a wavelength of at most 400 nm and at least 170 nm as a light source.

The entire disclosure of Japanese Patent Application No. 2003-418814 filed on Dec. 17, 2003 including specification, claims, drawings and summary is incorporated herein by reference in its entirety.

What is claimed is:

1. A synthetic quartz glass for an optical member to be used for an optical device employing a light having a wavelength in range of 170 nm to 400 nm as a light source, said synthetic quartz glass comprises (i) substantially no oxygen excess defects no dissolved oxygen molecules, and (ii) oxygen deficient defects within a range of at least $1\times10^{13}$ defects/cm$^3$ and at most $5\times10^{14}$ defects/cm$^3$ least, wherein a concentration of an OH group is most 100 ppm and a concentration of a chlorine is at most 10 ppm, and the ratios of the scattering peak intensity $I_{495}$ at 495 cm$^{-1}$ and the scattering peak intensity $I_{606}$ at 606 cm−1, to the scattering peak intensity $I_{440}$ at 440 cm$^{-1}$ in the laser Raman spectrum, $I_{495}/I_{440}$ and $I_{606}/I_{440}$ are at most 0.585 and at most 0.136, respectively.

2. The synthetic quartz glass according to claim 1, comprising substantially no reduction type defects attributable to SiH.

3. The synthetic quartz glass according to claim 2, which has a fluorine concentration of at most 100 ppm.

4. The synthetic quartz glass according to claim 2, comprising hydrogen molecules within a range of from $5\times10^{15}$ molecules/cm$^3$ to $1\times10^{19}$ molecules/cm$^3$.

5. The synthetic quartz glass according to claim 1, wherein the total content of alkali metals, alkaline earth metals and transition metals in the synthetic quartz glass is at most 100 ppb.

* * * * *